June 1, 1948.    R. A. MUELLER    2,442,548
WELL PRESSURE CONTROL EQUIPMENT
Filed April 8, 1944    5 Sheets-Sheet 1

Inventor:
Robert A. Mueller,
By Cushman Darby Cushman
Attorneys.

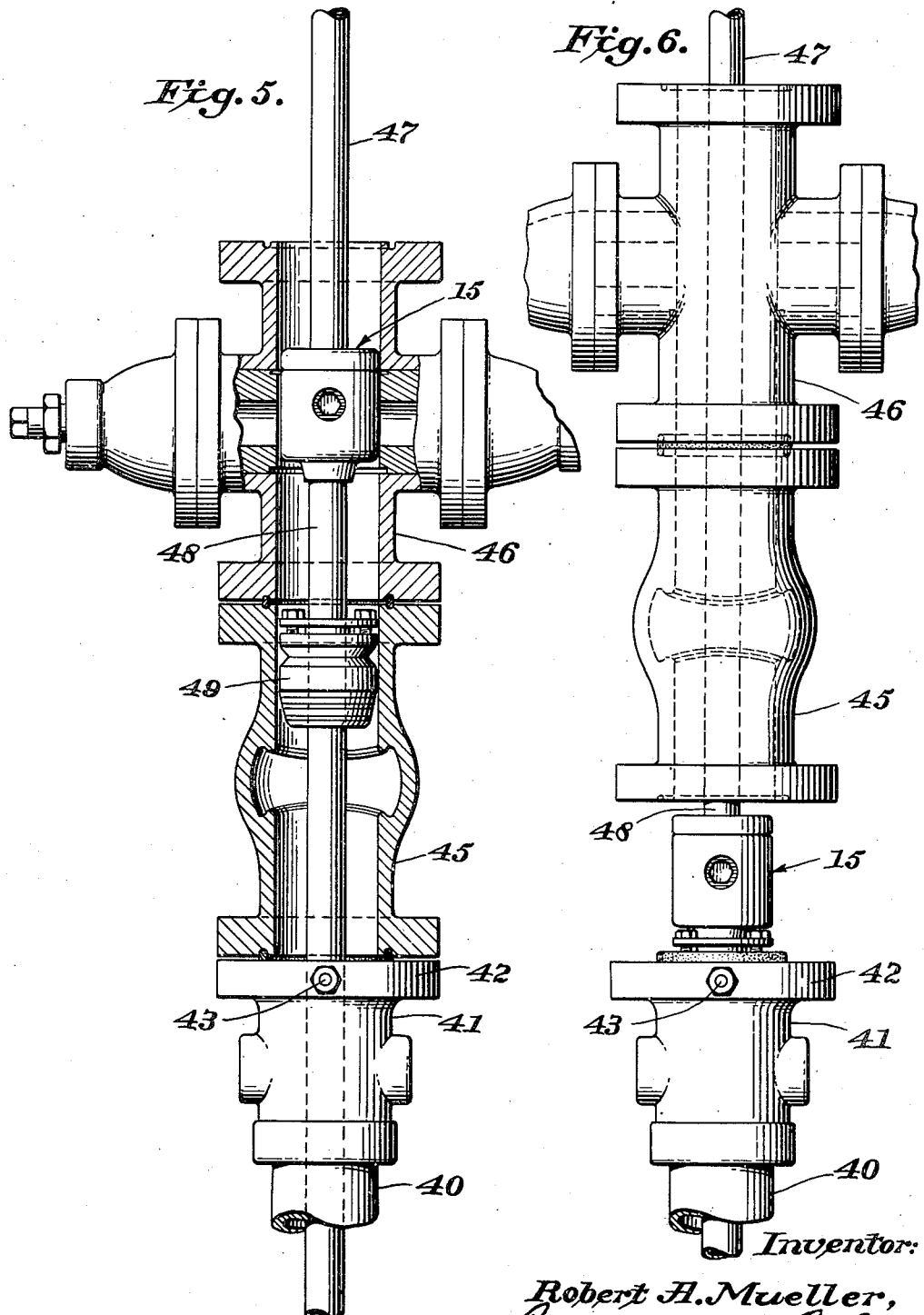

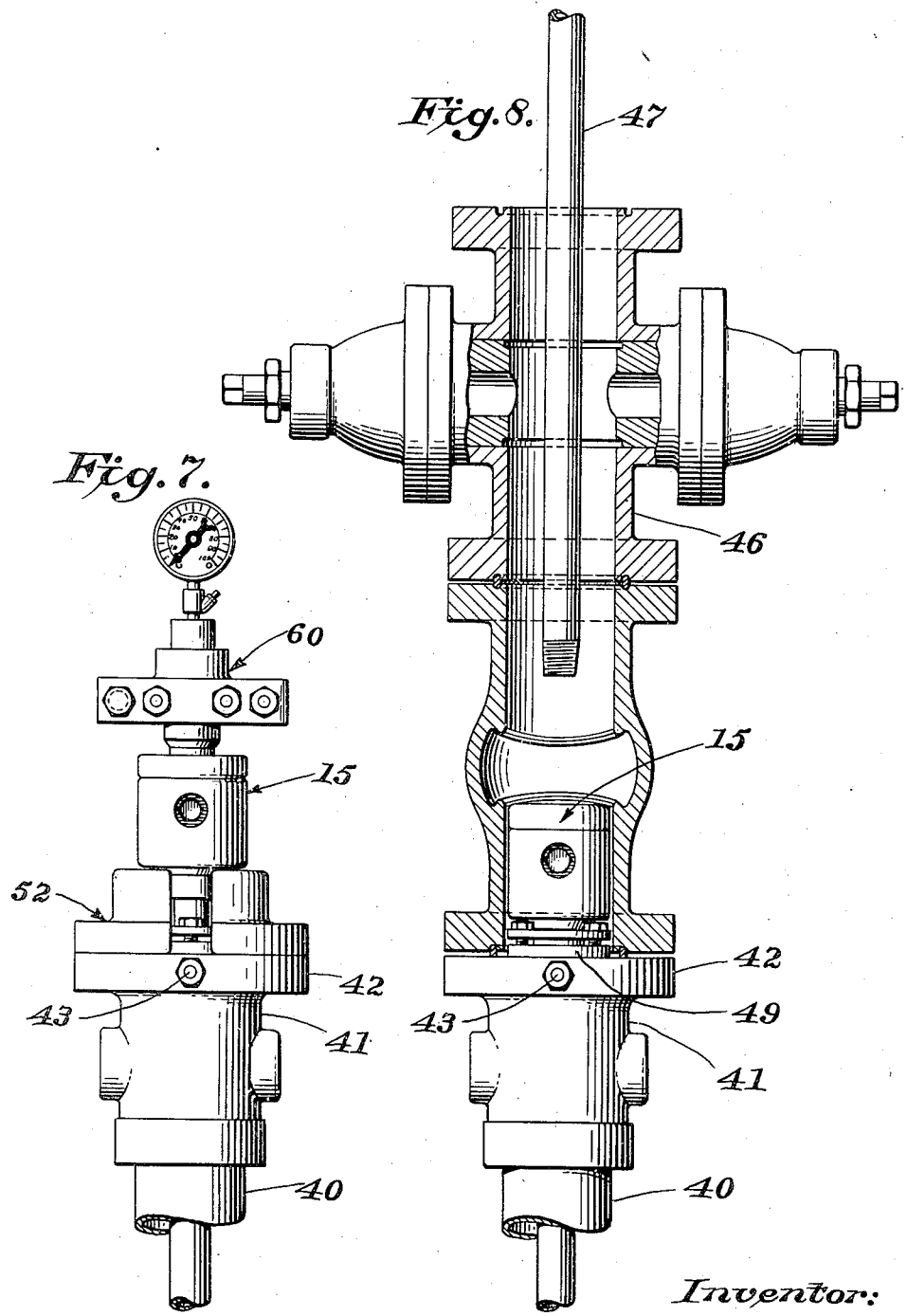

June 1, 1948. R. A. MUELLER 2,442,548
WELL PRESSURE CONTROL EQUIPMENT
Filed April 8, 1944 5 Sheets-Sheet 4

Inventor:
Robert H. Mueller,
By Cushman Darby Cushman
Attorneys.

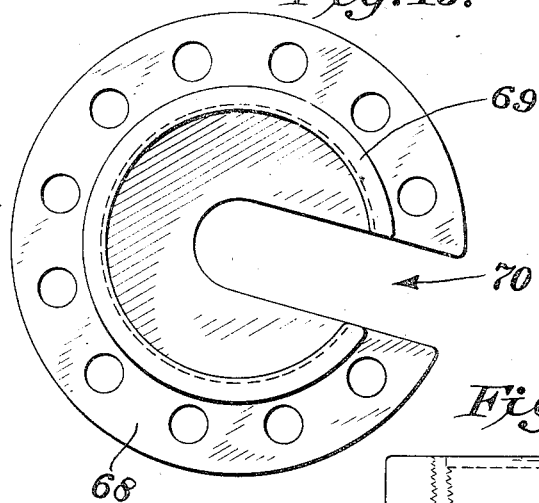
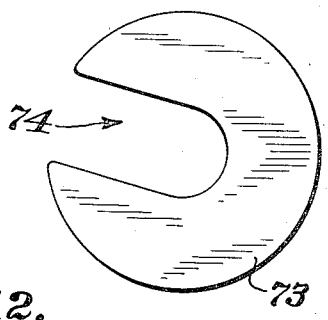
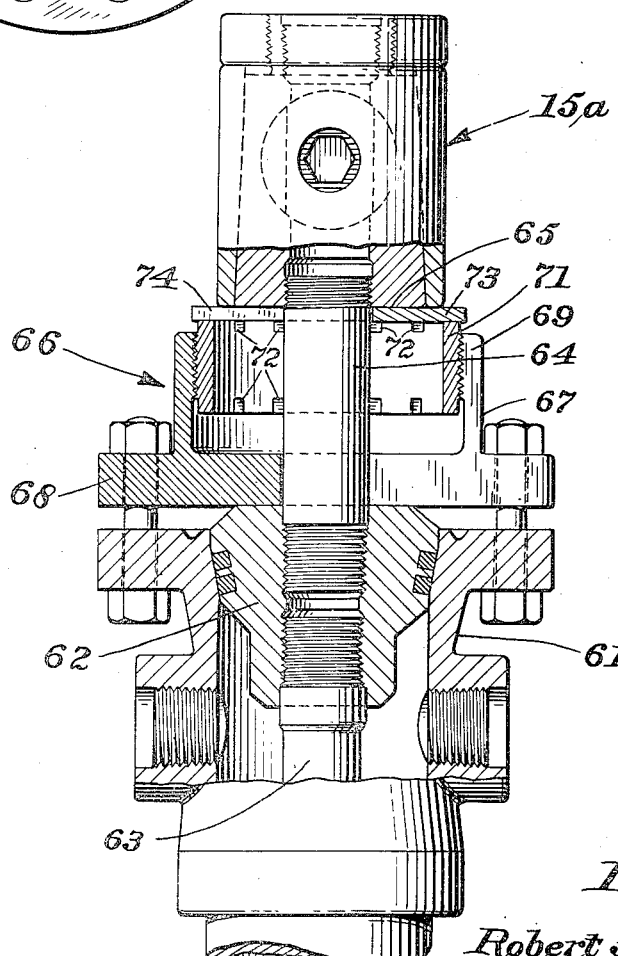

Patented June 1, 1948

2,442,548

UNITED STATES PATENT OFFICE 2,442,548

WELL PRESSURE CONTROL EQUIPMENT

Robert A. Mueller, Houston, Tex., assignor to Gray Tool Company, Houston, Tex., a corporation of Texas Application April 8, 1944, Serial No. 530,171

6 Claims. (Cl. 166—15)

This invention relates to means for preparing an oil well for flow and has as its principal object to provide for improved control over pressures, particularly those in the tubing, while disassembling or re-assembling the drilling control equipment.

In past practices, the disassembling of the control equipment has required the use of an inside back-pressure valve whose subsequent removal has required the use of pressure equalizing means to prevent the valve from being blown from the well when detached from the Canfield bushing or other holding means. If for some reason, the drilling control equipment has to be re-assembled on the well, the check valve must be re-inserted against pressure, a procedure both difficult and hazardous.

These difficulties are overcome, according to the present invention, by equipping the final tubing section with a master flow control valve of a size to enable it to be passed through the drilling control equipment, of a related size to the head, after which the said equipment can be freely lifted away for use elsewhere. The flow manifold man then be mounted on the master flow control valve and the valve opened. Tubing pressures are always under the control of this valve, casing pressures being held by suitable means such as a tubing hanger. If the drilling control equipment has to be re-assembled on the well, it is only necessary to close the master flow control valve and remove the manifold, whereupon the drilling control equipment can be telescoped over the master flow control valve and secured to the casing head.

Another object of the invention is to provide means interposable between the casing head and master flow control valve to support the latter against strains from superimposed flow equipment and thereby prevent injury to the adjacent part of the tubing.

A further object is to provide a new valve construction particularly adapted for use as the master flow control valve herein contemplated, although susceptible of other uses.

The invention will be particularly described with reference to the attached drawings, wherein Figure 1 is a side elevation of the new valve.

Figure 5 shows a well head installation, partly in vertical section, with a valve in accordance with the invention suspended from a nipple and in turn suspending a tubing string which carries a stuffing box type tubing hanger and casing seal.

Figure 6 shows the equipment of Figure 5 but with the hanger seated and supporting the valve and with the drilling control equipment of Figure 5 detached and elevated.

Figure 7 is an elevation showing the valve seated on a supporting member, as contemplated under the invention, and equipped with a flow manifold.

Figure 8 is a view like that of Figure 5 but contemplating the re-assembly of the drilling control equipment on the well preparatory to the lifting of the valve and tubing.

Figure 12 shows a well head installation partly in vertical section illustrating an adaptation of the invention to use with a hanger of the boll weevil type.

Figure 13 is a plan view of a member constituting part of a valve support which appears in Figure 12, and Figure 14 is a plan view of a further part of the valve support shown in Figure 12.

Figure 1:
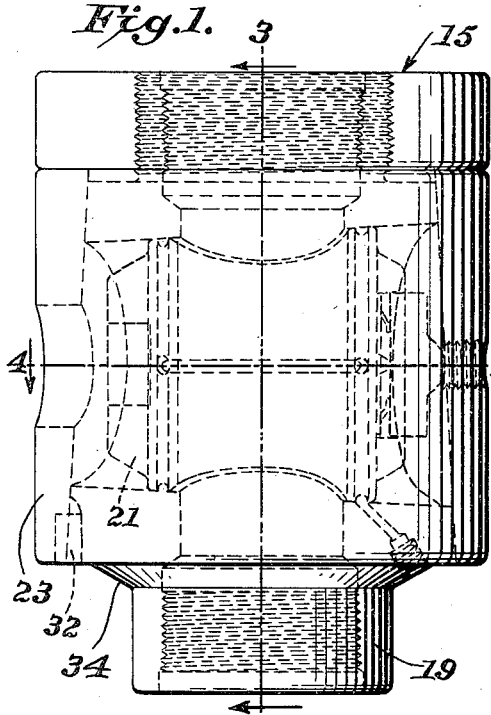

Referring to the drawings and first to Figures 1 to 4, the master flow control valve generally indicated by the reference numeral 15 comprises a body 16 provided with a bore 17. The body includes end neck portions 18 and 19 of which the former is threaded interiorly and exteriorly and the latter is threaded interiorly. Intermediate the neck portions, the body is slightly conical on the axis of bore 17, tapering toward the neck 18.

Bore 17 is intersected by a conical valve seat 20 with which cooperates a mating plug 21 having a passage 22 registrable with the bore 17. The valve plug is entirely within the valve body when operatively disposed.

Reference numeral 23 designates a sleeve which is externally cylindrical but which is internally tapered as the body portion 16 and embraces the latter so as to tightly close the ends of the valve seat 20, the sleeve being held in place by a ring 24 threaded on the neck 18.

At its large end, the valve plug has an axial recess 25 in which is slidable a block 26 and a compression spring 27 is disposed between the block and the bottom of the recess. Externally, the block has a rounded bearing boss 28 which engages a socketed plug 29 threaded in the sleeve 23 without projecting outwardly of the sleeve. Spring 27 serves to seat the plug 21 with a force determined by the adjustment of the abutment plug 29. The small end of the valve plug is provided with a socket 30 engageable by a turning tool inserted through an opening 31 in the sleeve 23. The sleeve is held in predetermined relation to the body by a key 32.

Reference numeral 33 designates a plug threaded in a conical portion 34 at the base of neck 19 and closing a lubricating duct 34' which extends to a peripheral lubricant groove 35 at the large end of plug 21, the groove 35 being connected with a groove 36 in the other end of the plug 21 by ducts 37 and 38. Plug 33 is threaded in sufficiently so as not to obstruct the surface 34.

The valve as described is readily assembled and may be made of great strength so as to readily withstand oil well pressures, and its cylindrical side walls are entirely unobstructed.

Figure 9:
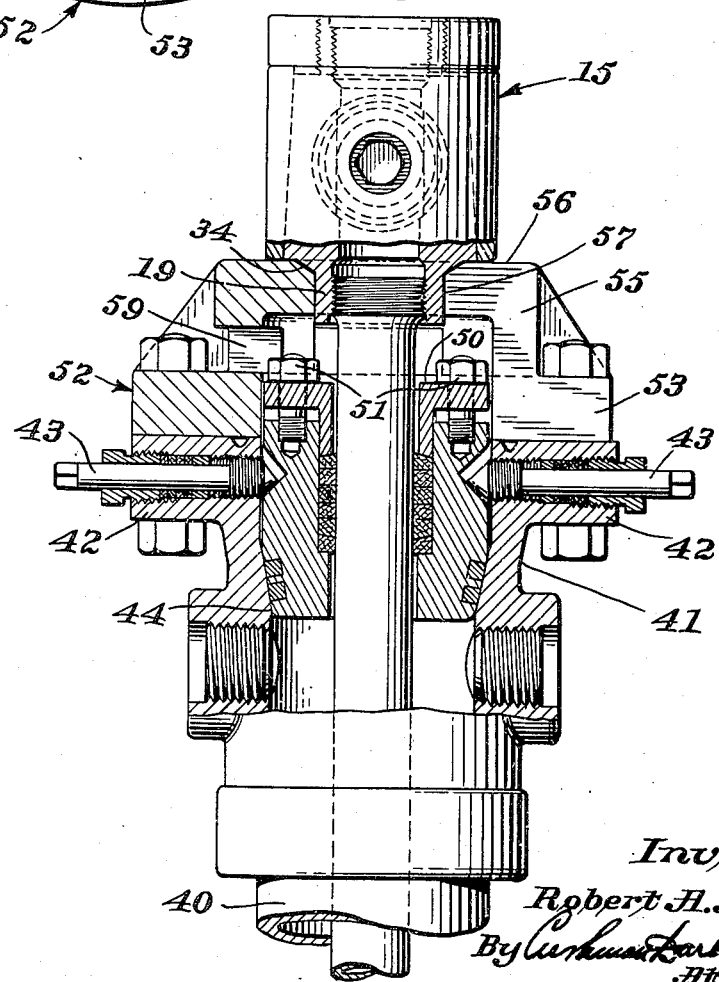
Figure 9 is a view generally like that of Figure 7 but on an enlarged scale and partly in vertical section and omitting the flow manifold.

In Figure 5, reference numeral 40 designates a casing having secured thereto a head 41 having a bolt flange 42 in which packed hold-down screws 43 are radially threaded, see also Figure 9. The upper portion of the head bore is cylindrical in correspondence with the rated size of the casing and terminates downwardly in a downwardly tapered seat 44. Secured on the flange 42 is control equipment here shown as comprising a master drilling control valve 45 and a blow-out preventer 46 of the same rated size as the head 41 so that pressure subject areas are not unduly increased.

Reference numeral 47 designates a nipple engaged with the internal threads of neck 18 of the master flow control valve 15 whose diameter is such as to enable it to be passed with slight clearance through the control equipment. Reference numeral 48 designates the upper or final section of a tubing string threaded into the neck 19 and so suspended from the valve and nipple. Below the valve, a stuffing box type tubing hanger and casing seal 49 is strung on the tubing, this hanger including, Figure 9, a gland ring 50 secured to the hanger body by screws having heads 51 above the ring.

Figure 10:
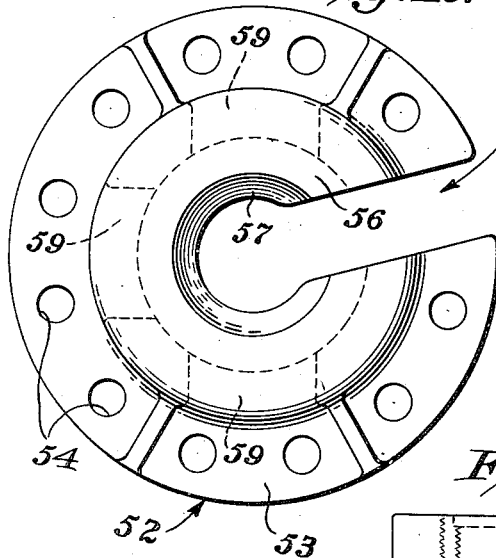
Figure 10 is a plan view of the support which appears in Figures 7 and 9.
Figure 11:
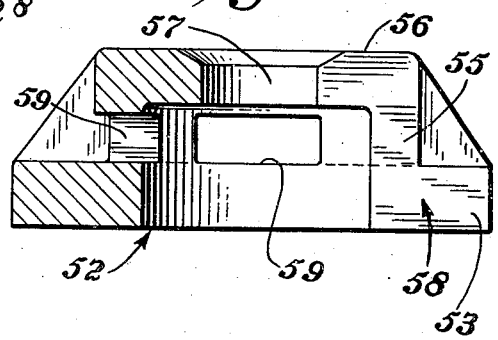
Figure 11 is an axial section of the support of Figure 10.

With screws 43 retracted, the tubing is lowered and carries the hanger into the casing head seat to form a seal between the latter and the tubing, as shown in Figure 9, and the screws 43 are then run in to hold the hanger down. At this point, the valve 15 rests on the hanger, as in Figure 6, and the nipple 47 may be unscrewed, the drilling control equipment lifted away, and the flow manifold applied to the valve. However, in order to shield the tubing from strains from the superimposed equipment, a support such as is shown at 52, Figures 9, 10 and 11, may be interposed between the head and valve after lifting the latter somewhat while the drilling control equipment is elevated in the manner shown in Figure 6.

The support 52, Figures 7, 9, 10 and 11, comprises a circular flange 53 provided with bolt holes 54 through which it can be bolted to the head flange 42 in the manner shown in Figure 9. Centrally, the support is upwardly domed to provide a cage portion 55 having a flat top wall 56 provided with a central seat 57 adapted to receive the neck 19 and conical portion 34 of the valve 15 with the flat outer portion of the valve underside resting on the wall. The support is provided with a radial slot 58 which intersects the seat 57 and is of a width somewhat greater than the outer diameter of the tubing but less than the outer diameter of the neck 19.

With the drilling control equipment lifted, as in Figure 6, the nipple 47 is pulled up to lift valve 15 sufficiently so that the support 52 can be slid to position thereunder. The support is then bolted in place and the valve lowered to its seat. The nipple can now be unscrewed and it and the drilling control equipment removed leaving the installation as shown in Figure 9. In addition to the opening formed by the slot 58, the cage has side openings 59 so that the hanger can be inspected for leakage with the screw heads accessible for tightening if required.

In Figure 7, a manifold 60 is shown as directly applied to the top of valve 15, this manifold being, by way of example, that shown in the patent to Cullen, No. 2,043,428, granted June 9, 1936. Valve 15 may now be opened, thus placing flow under the control of the manifold.

Figure 2:
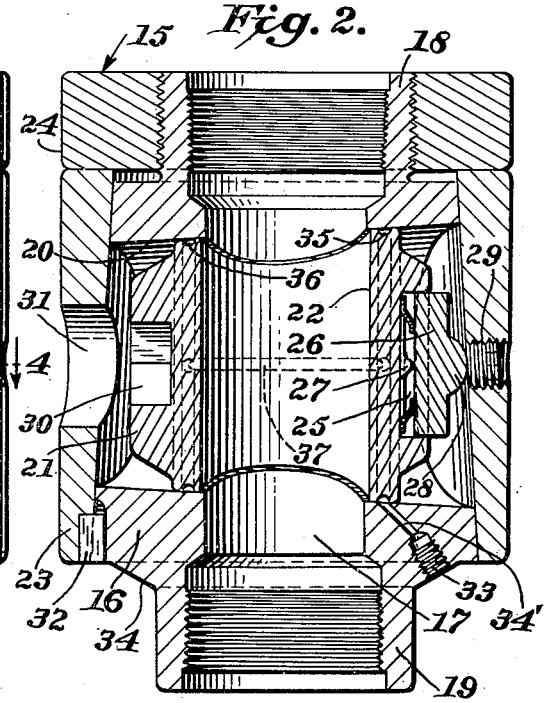
Figure 2 is a vertical section of the valve of Figure 1 taken on the axis of a plug which forms a part of the valve.
Figure 3:
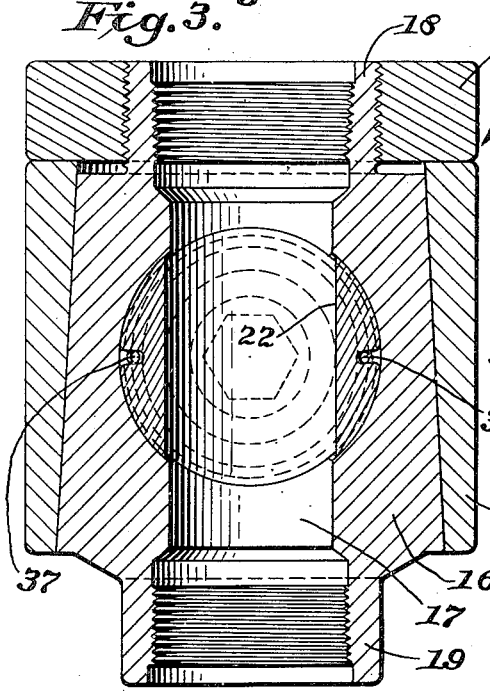
Figure 3 is a section on line 3—3 of Figure 1.
Figure 4:
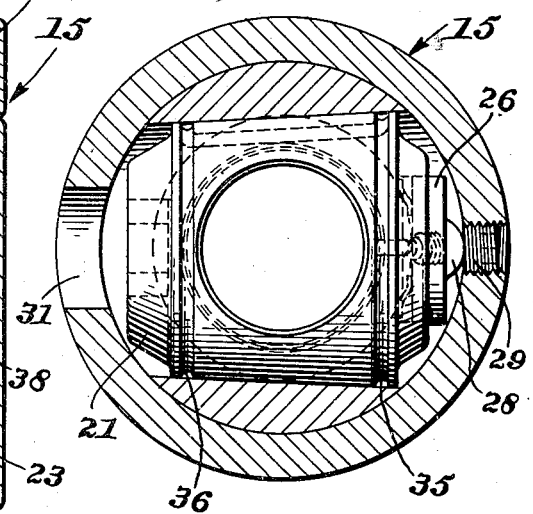
Figure 4 is a section on line 4—4 of Figure 1.

With the valve directly attached to the nipple, as shown in Figure 2, it will be closed prior to lowering. However, it is contemplated under the invention that closure means may be present above the valve, in which case the latter would be open. For example, a back pressure valve may be attached above the flow control valve and engaged with a tubing lift nipple attachable by means of a swivel to the pumps for circulation. The flow control valve would remain open until closed to permit detachment of the back pressure valve and mounting of the manifold.

In Figure 8, the drilling control equipment is shown re-assembled on the head, a procedure greatly facilitated by the present invention. Preliminarily, valve 15 was closed, the manifold removed, and the nipple engaged with the valve to lift it sufficiently so that the support 52, after unbolting, could be removed. The valve was then lowered onto the packer 49 and the nipple removed. Thereupon the drilling control equipment was telescoped over the valve and bolted to the head, as shown. The nipple is shown as about to be re-engaged with the valve for the purpose of lifting it and the tubing.

In Figure 12, the casing head 61 has an upper downwardly tapering seat adapted to receive and seal with a hanger 62 of the boll weevil type which supports the tubing 63. Threaded into the upper end of the hanger is a short tubing section 64 whose upper end is threaded into the master flow control valve 15a, this section 64 constituting, in effect, a portion of the final tubing section 63. The valve 15a is the same as the valve 15 except that it is extended in full diameter to its lower end to provide a flat seating surface 65 which replaces the neck 19 of valve 15. The assembly is lowered through the drilling control equipment in the same manner as in the first case to seat the hanger, whereupon the drilling control equipment is removed.

Reference numeral 66 designates generally a thrust assembly for supporting valve 15a so as to shield the tubing from the strain of superimposed flow control equipment and for holding the hanger in its seat. The assembly 66 includes a base member 67 which comprises a circular plate 68 adapted to be bolted to the casing head flange and rising from this plate concentrically therewith is an internally threaded circular collar 69. The plate is provided with a radial slot 70 whose width is slightly greater than the outside tubing diameter, the slot interrupting the collar 69 and enabling the member 67 to be moved laterally to the position shown in Figure 12 and bolted to the head flange. When so positioned, the top of collar 69 is spaced a distance below the lower surface 65 of the valve.

Reference numeral 71 designates an externally threaded ring designed for engagement with the threads of collar 69 and having an internal diameter slightly greater than the diameter of valve 15a so that after the member 67 has been bolted to the head, the ring can be slipped downwardly over the valve and threaded into the collar 69 by means of a spanner engaging the notches 72. The ring is threaded downwardly sufficiently to permit the insertion of a flat disc 73, having a radial slot 74, between the top of the ring and the bottom of the valve whereupon the ring is threaded upwardly so as to cause disc 73 to engage the surface 65 of the valve so that the latter is securely supported against lateral stresses. The manifold can now be applied and valve 15a opened. Obviously, the drilling control equipment can be quickly re-assembled on the head after the removal of assembly 66.

The above examples demonstrate how, in accordance with the invention, tubing pressures may be readily kept under complete control at all times. I do not limit myself to details of the described procedure nor to the described form and arrangement of apparatus. Variations are possible and are contemplated under the claims which follow.

I claim:

1. In a well head installation comprising a casing and a casing head adapted to have secured thereto drilling control equipment, a boll weevil type tubing hanger supported by and sealing with the head, said hanger being of a size which will pass through said drilling control equipment, tubing supported by the hanger, a short tubing extension projecting above the hanger, a master flow control valve secured to said extension and accessible for manipulation, said valve being of a size to permit drilling control equipment of a related size to the head to be lowered thereover and secured to the head and to permit the valve and therewith the hanger to be lifted through said equipment, and a removable thrust member interposed between the casing head and valve and supporting the latter against strains from superimposed equipment, said thrust member including a flange secured to the casing head, an upright threaded collar rising from said flange, a ring threadedly engaged with the collar and of a size to be passed over the valve, and a plate adapted to rest on the ring and support the valve, said flange and collar and said ring being radially slotted to permit them to be laterally moved to and from operative position with respect to said extension.

2. Apparatus for use on wells having formation pressure therein, comprising a tubing head equipped for attachment to the casing and having an inside seat, a tubular bushing formed to seal in said seat and having a bore with sealing means therein to slidably pass the tubing and seal therewith, a Christmas tree manifold control valve comprising a housing having a valve member therein, said housing having means at its lower end for rigidly attaching same to the upper end of the tubing above said bushing and said head to support the tubing in depending relation therefrom, said housing having means at its upper end for the connection of a lift nipple, said tubing head having means for the attachment of control equipment thereon of rated size with the casing on which said head is mounted, said bushing and the housing of said valve being of shape and size to pass through the control equipment whereby mechanical control of the well may be maintained, said valve member having means operable laterally from the exterior of said housing to close same when said valve is exposed above said bushing and tubing head with the control equipment removed.

3. Apparatus for use on wells having formation pressure therein, comprising a tubing head equipped for attachment to the casing and having an inside seat, a tubular bushing formed to seal in said seat and having a bore with sealing means therein to slidably pass the tubing and seal therewith, a Christmas tree manifold control valve comprising a housing having a valve member therein, said housing having means at its lower end for rigidly attaching same to the upper end of the tubing above said bushing and said head to support the tubing in depending relation therefrom, said housing having means at its upper end for the connection of a lift nipple, said tubing head having means for the attachment of control equipment thereon of rated size with the casing on which said head is mounted, said bushing and the housing of said valve being of shape and size to pass through the control equipment whereby mechanical control of the well may be maintained, said valve member having means operable laterally from the exterior of said housing to close same when said valve is exposed above said bushing and tubing head with the control equipment removed, and a supporting member having upper means to engage said housing and lower means to engage said head, and having a radial slot therein of size permitting lateral application of said support to the tubing between said housing and said head, whereby to support the weight of the Christmas tree and the tubing on said head.

4. Apparatus for use on wells having formation pressure therein, comprising a tubing head equipped for attachment to the casing and having an inside upwardly tapered seat, an upwardly tapered tubular bushing formed to seal in said seat and having a bore with sealing means therein to slidably pass the tubing and seal therewith, a Christmas tree manifold control valve comprising a housing having a valve member therein, said housing having means at its lower end for rigidly attaching same to the upper end of the tubing above said bushing and said head to support the tubing in depending relation therefrom, said housing having means at its upper end for the connection of a lift nipple, said tubing head having a laterally extending flange for the attachment of control equipment thereon of rated size with the casing on which said head is mounted, pressure proof locking screws extending laterally through said flange to lock said bushing in said seat, said bushing and the housing of said valve being of shape and size to pass through the control equipment whereby mechanical control of the well may be maintained, said valve member having means operable laterally from the exterior of said housing to close same when said valve is exposed above said bushing and said tubing head with the control equipment removed, and a separate support formed for lateral attachment around the tubing and having means to transfer the load of the weight of the tubing and Christmas tree onto the flange of said tubing head.

5. Apparatus for use on wells having formation pressure therein and equipped with casing and tubing, comprising a tubing head having means for attaching same to the casing and having an inside hanger seat, said tubing head having means for the attachment of control equipment thereon of rated size with the casing on which said head is mounted, a boll weevil type tubing hanger supported by said head in sealing engagement in said seat, a master flow control valve rigidly connected with said hanger and positioned above said hanger and said head when said hanger is landed in said seat whereby it is accessible to be opened and closed when said control equipment is removed from said head, said hanger being of size and shape to pass through said control equipment to said seat, said valve being of size and shape to permit said control equipment to be lowered thereover and secured to said head to thus provide for the lifting of said valve and said hanger through said control equipment while maintaining mechanical control of the well.

6. Apparatus for use on wells having formation pressure therein and equipped with casing and tubing, comprising a tubing head having means for attaching same to the casing and having an inside hanger seat, a unitary control device for maintaining control of the well both within and around the tubing comprising a lower hanger portion and an upper valve portion rigidly connected to said hanger portion, said hanger portion being formed to seal in said seat and having means for attachment to the tubing to support the latter in depending relation therefrom, said valve portion comprising a substantially cylindrical housing having an axis coinciding with that of the tubing and having a cylindrical vertical bore therethrough of diameter substantially equal to the interior diameter of the tubing, said housing having a lateral bore therein at right angles to said axis and a valve member mounted for rotation in said lateral bore between closed and open positions, said valve member having a cylindrical bore therethrough adapted to be aligned with said vertical bore through said housing, when said valve member is in its open position, the bores of said housing and valve member being of substantially equal diameter, said housing having means at its upper end for connection with a lift nipple, said tubing head having means for the attachment of control equipment thereon of rated size with the casing on which said head is mounted, said control device including its hanger and valve portions being of shape and size to pass through the control equipment whereby mechanical control of the well may be maintained at all times, said control device being of sufficient vertical dimension to position said valve portion and its valve member above the upper end of said tubing head when said hanger portion is landed in said seat, said valve member having means operable laterally from the exterior of said housing to close and open same when the control equipment is removed from said head.

ROBERT A. MUELLER.

REFERENCES CITED

The following references are of record in the file of this patent:

UNITED STATES PATENTS

| Number | Name | Date |
|---|---|---|
| 1,502,106 | Lyne | July 2, 1924 |
| 1,981,279 | Mueller | Nov. 20, 1934 |
| 2,043,428 | Cullen | June 9, 1936 |
| 2,092,261 | Rector | Sept. 9, 1937 |
| 2,148,327 | Smith et al. | Feb. 21, 1939 |
| 2,150,887 | Mueller et al. | Mar. 14, 1939 |
| 2,241,288 | Yancey | May 6, 1941 |
| 2,292,873 | Finegan | Aug. 11, 1942 |
| 2,329,981 | Church et al. | Sept. 21, 1943 |